United States Patent [19]
Borns et al.

[11] 3,850,445
[45] Nov. 26, 1974

[54] COMBINED AIR SPRING AND LEAF SPRING SUSPENSION

[75] Inventors: David R. Borns; William C. Pierce, both of Muskegon, Mich.

[73] Assignee: Lear Siegler, Inc., Santa Monica, Calif.

[22] Filed: Feb. 11, 1974

[21] Appl. No.: 441,669

[52] U.S. Cl. .............................. 280/124 F, 267/31
[51] Int. Cl. ............................................. B60g 11/46
[58] Field of Search ............ 280/124 F; 267/15, 18, 267/24, 31, 52

[56] References Cited
UNITED STATES PATENTS
2,754,111   7/1956   Norrie .............................. 267/52 X
3,140,083   7/1964   Paul ..................................... 267/31

Primary Examiner—Philip Goodman
Attorney, Agent, or Firm—Barnes, Kisselle, Raisch & Choate

[57] ABSTRACT

Air springs transmit vertical load of a vehicle frame to a transverse beam whose ends are hung in load transmitting relation on leaf springs which absorb drive and brake torque and lateral thrust. The air springs carry about 85 per cent of the vertical load facilitating termination of most of the spring leaves adjacent the axial load center of the beam. A torsion stabilizing bar has sloped legs shackled to the axle to permit arcuate swinging of the legs while following linear vertical movement of the axle.

31 Claims, 9 Drawing Figures

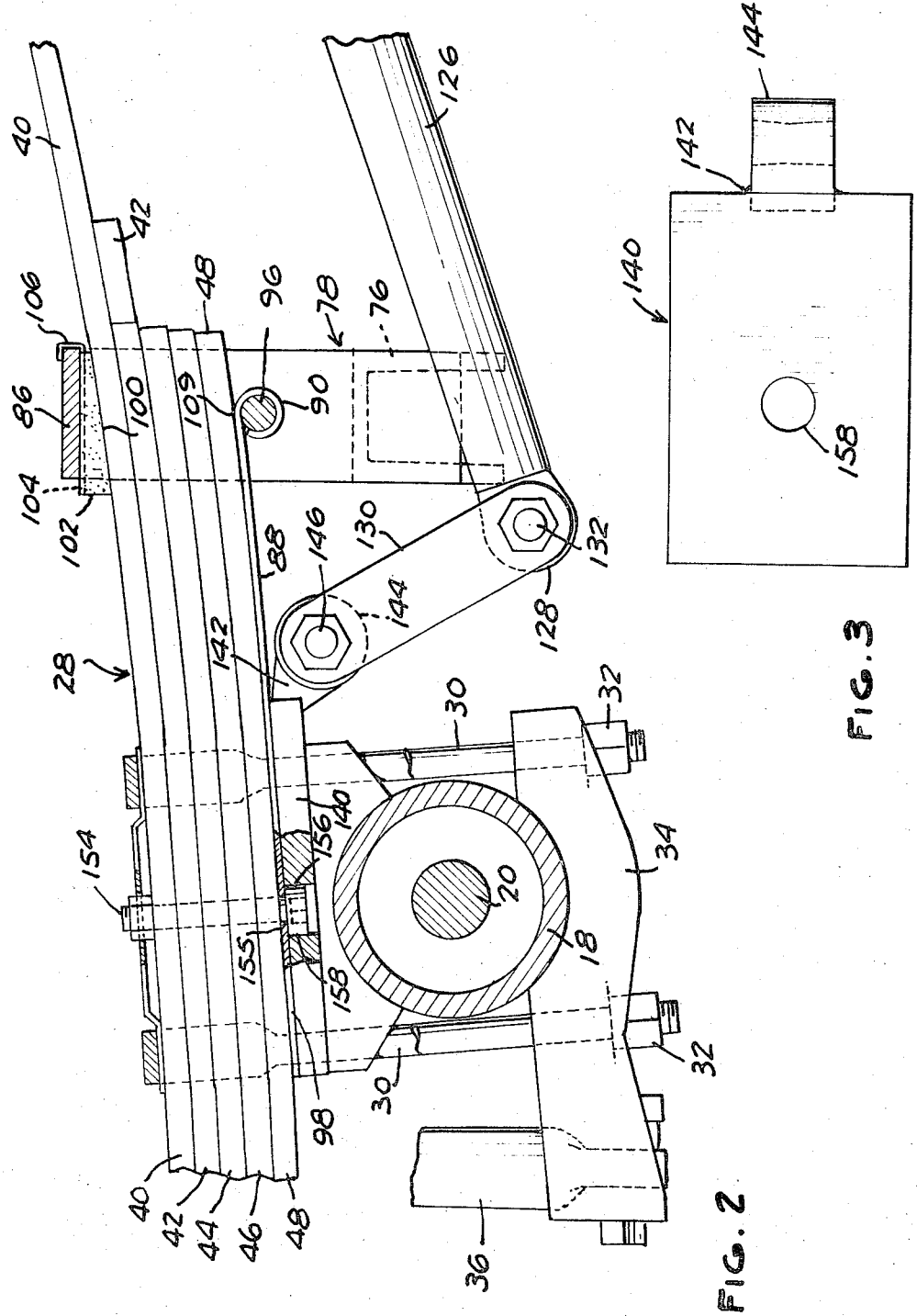

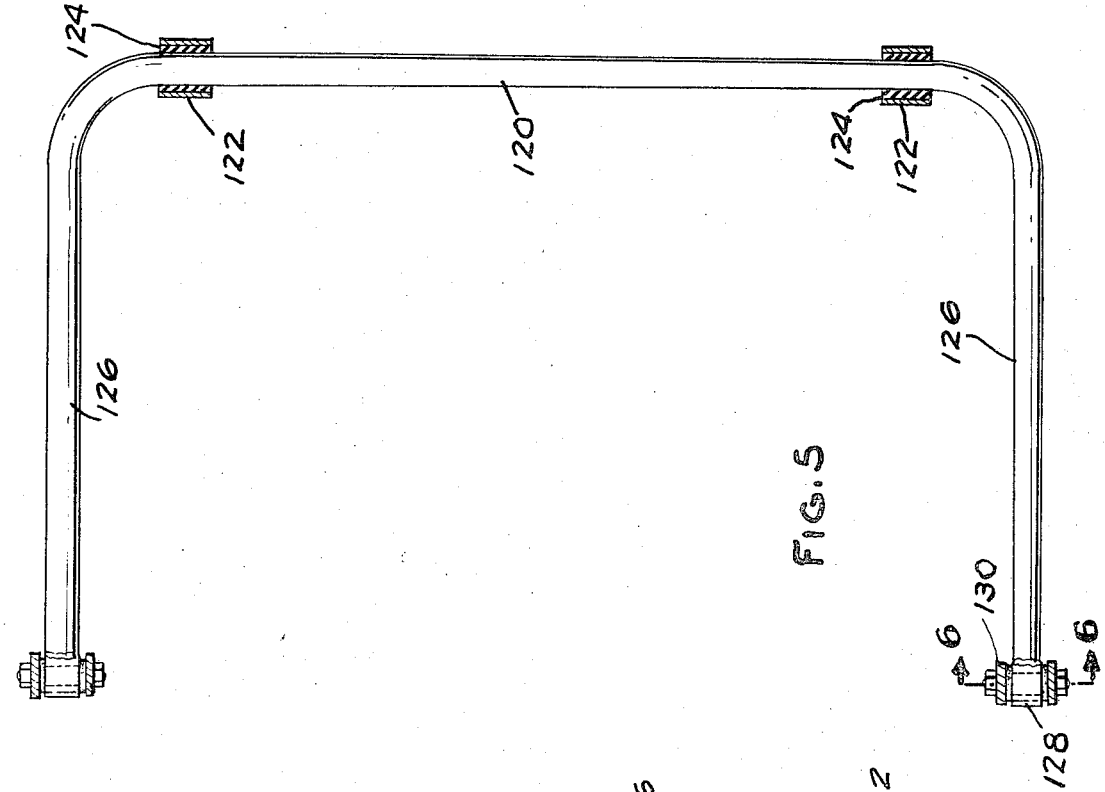
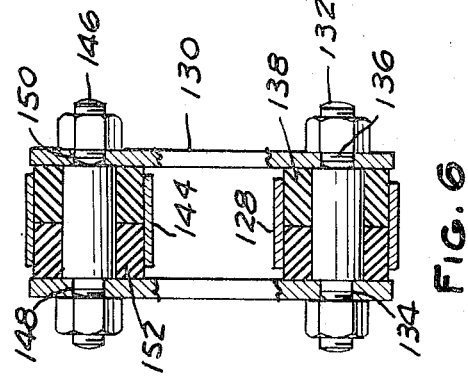
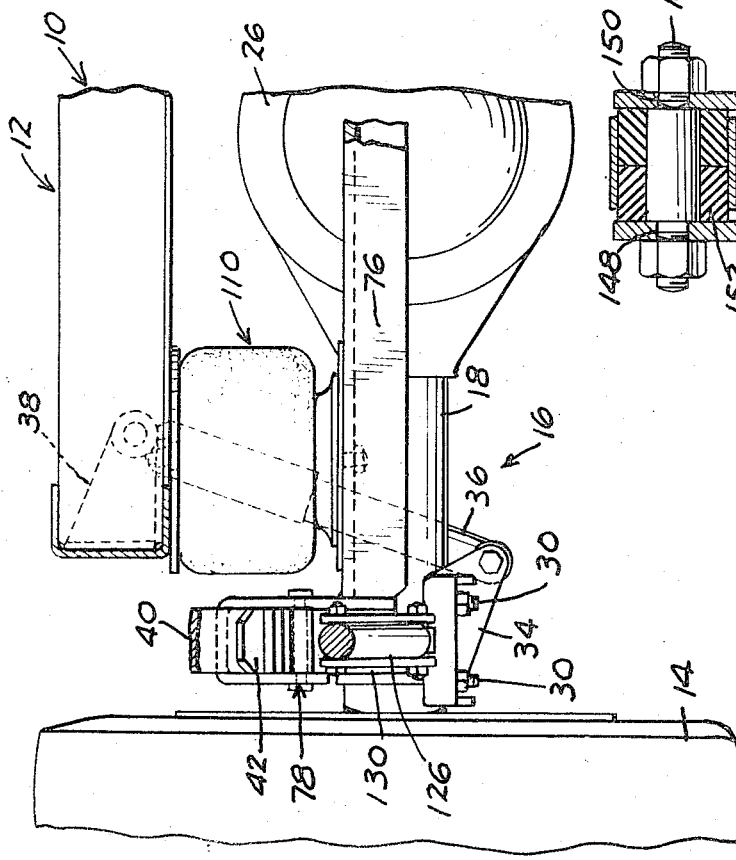

COMBINED AIR SPRING AND LEAF SPRING SUSPENSION

This invention relates generally to vehicle suspensions having air springs and more particularly to a suspension utilizing air springs in combination with leaf springs.

An air spring is essentially an inflated flexible bag and has insignificant lateral stability. It is conventional in an air spring suspension to dispose the air springs between a vehicle frame and mechanical components such as structurally rigid, vertically swingable control arms affixed to an axle. These components absorb all of the forces on the suspension except the vertical load absorbed by the air springs. Such forces include driving and braking torque and lateral thrust incidental to turning movements of the vehicle.

Examples of such suspensions are disclosed in Masser U.S. Pat. Nos. 3,332,701 and 3,406,983. Conventionally, such suspensions are utilized in commerical vehicles designed to carry loads of about 12,000 pounds to about 22,000 pounds per axle and more. The vertical swinging control arms which control torque and lateral thrust in these suspensions are too massive and expensive for use in relatively light duty trucks designed to carry, for example, about 4,000 pounds to about 10,000 pounds per axle. Moreover, these conventional suspensions also have a spring rate which is too high to provide an acceptably soft ride in such light duty vehicles.

The object of the present invention is to provide a relatively simple, inexpensive, light weight air spring suspension structure of improved ride characteristics and which is suitable for use in light duty trucks and comparable vehicles. One form of the invention is shown in the accompanying drawings.

FIG. 2 is an enlarged scale, fragmentary view of a portion of the structure shown in FIG. 1 with parts broken away and shown in section to illustrate structural detail.

FIG. 3 is a plan view of a shackle anchor.

FIG. 4 is a sectional view on line 4—4 of FIG. 1.

FIG. 5 is a sectional view on line 5—5 of FIG. 1.

FIG. 6 is an enlarged scale sectional view on line 6—6 of FIG. 5.

Figure 1:
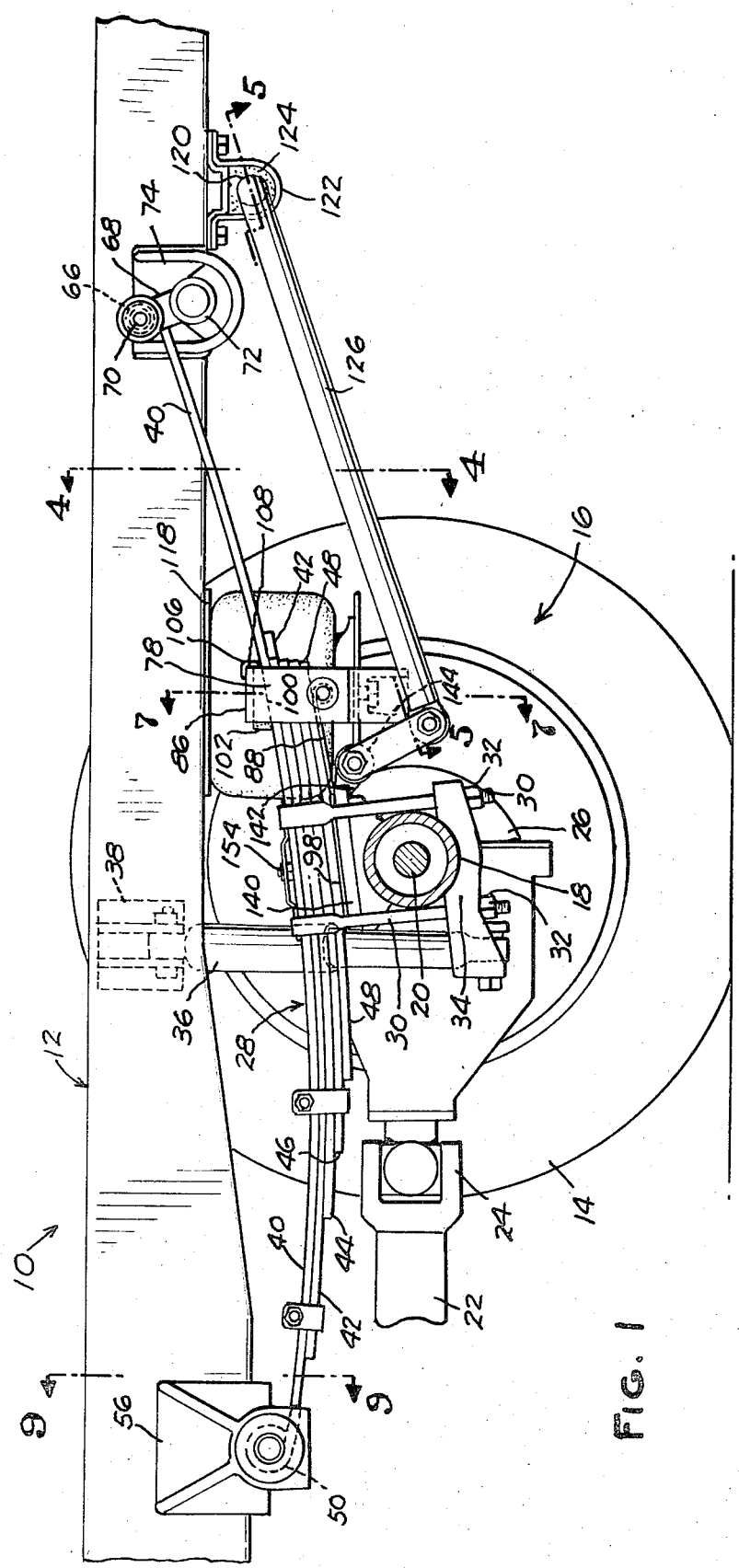
FIG. 1 is a fragmentary, generally elevational view of a vehicle with a suspension according to the present invention mounted thereon.
Figure 9:
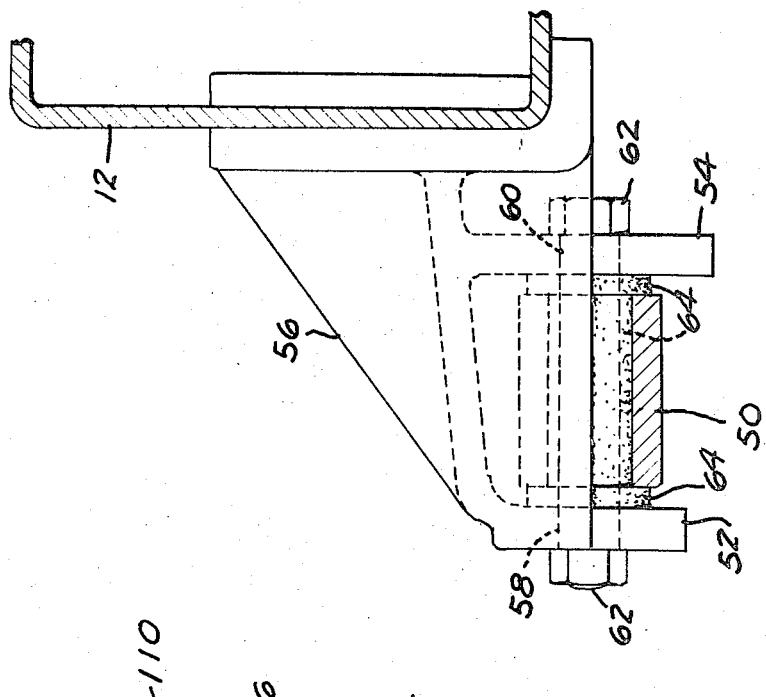
FIG. 9 is an enlarged scale sectional view on line 9—9 of FIG. 1.

Illustrated in the drawings is a vehicle 10 having a frame 12 from which ground engaging wheels 14 are suspended through a suspension 16 according to the present invention. The suspension includes an axle 18 upon which the wheels are mounted. The axle is illustrated as being live or driven, having an axle shaft 20 which drives wheels 14, the shaft in turn being driven by a conventional drive shaft 22, universal joint 24, and differential 26.

Axle 18 is anchored adjacent each end to a central portion of a leaf spring 28 by means of a pair of U-shaped bolts 30 engaged over the top of the leaf spring and secured by nuts 32 to a cradle 34 beneath the axle.

A conventional shock absorber 36 adjacent each side of the vehicle is secured to cradle 34 and a bracket 38 on frame 12.

Spring 28 comprises a number of leaves 40–48 in stacked relation. Top leaf 40 has an eye 50 at one end which is disposed between depending legs 52, 54 of a bracket 56 secured to frame 12. The legs have openings 58, 60. Eye 50 is connected to bracket 56 by a bolt 62 which passes through these openings and the eye. This connection is either elastomer or metal bushed as represented at 64. The other end of leaf 40 also has an eye 66 connected to a shackle 68 by an elastomer or metal bushed bolt 70, the shackle being pivotally mounted at 72 on a bracket 74 secured to frame 12 in a conventional manner.

Figure 7:
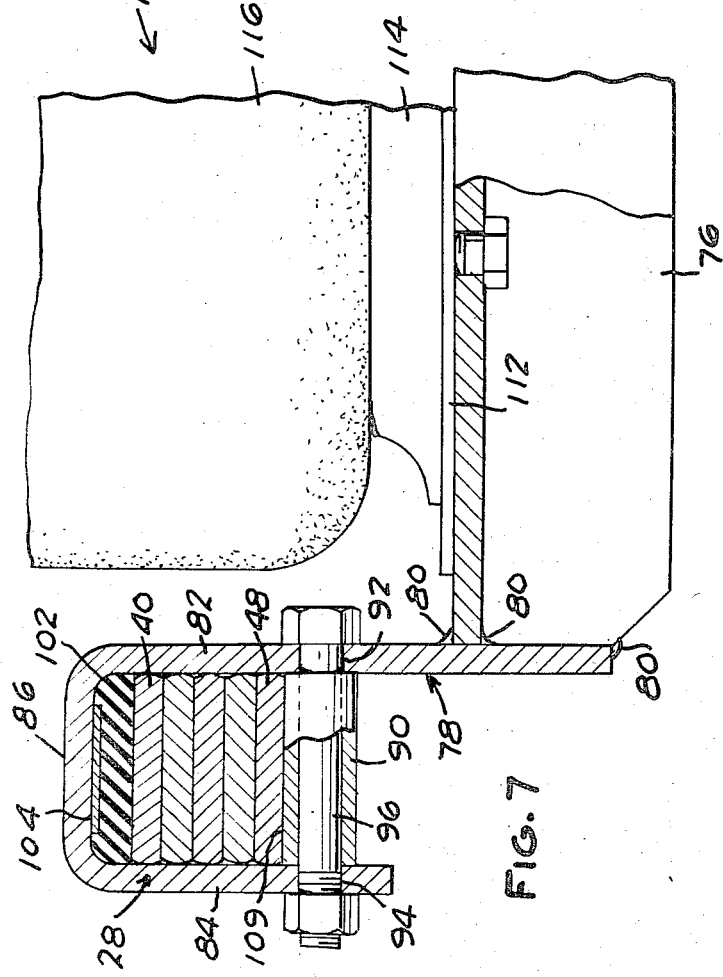
FIG. 7 is an enlarged scale sectional view on line 7—7 of FIG. 1.
Figure 8:
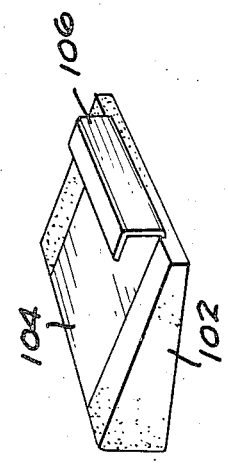
FIG. 8 is a perspective view of a tapered elastomer cushion.

A beam 76 extending generally parallel to axle 18 is suspended from leaf springs 28 by a hanger 78 secured to each end of the beam as by welding 80 (FIG. 7). Hanger 78 has two sides 82, 84 which embrace opposite sides of the spring stack and the hanger sides are interconnected by a top 86 which extends over the top of the spring stack.

Each hanger 78 is secured at a predetermined longitudinal location relative to its spring 28 by means of a flat, strap-shaped anchor 88 which acts as both a tie and a strut. Anchor 88 has an eye 90 aligned between a pair of openings 92 and 94 in the hanger legs and a bolt 96 passes through these openings and eye 90 to fasten anchor 88 to hanger 78. The other end portion 98 of anchor 88 is secured between spring 28 and axle 18 as is brought out in greater detail below.

Hanger top 86 extends in a generally horizontal direction while the top portion 100 of spring 28 beneath it is disposed on a slope with the result that top 86 and spring portion 100 define a tapered space as illustrated in FIGS. 1 and 2. This space is filled by a complementally tapered cushion of elastomeric material 102. The cushion is held in place by such means as a strip of metal 104 bonded to the elastomeric material and having an upward extension fashioned as a clip 106 hooked around an end 108 of hanger 78 facing away from axle 18. Top 109 of anchor 88 (FIG. 7) is engaged against bottom spring leaf 48 to contain leaf spring 28 firmly within hanger 78.

An air spring 110 is mounted adjacent each end of the beam 76 and is positioned to underlie a member of frame 12. In the structure illustrated, the air spring comprises a pedestal 112 secured to the top of beam 76, a plunger or piston member 114 on the pedestal, a flexible inflatable air bag 116 into which piston 114 projects and a top mounting plate 118 secured to the vehicle frame. The structure of the air spring is conventional. Hangers 78 are so positioned longitudinally of springs 28 that beam 76 is displaced from axle 18 to insure adequate vertical space for air springs 110.

A torsion bar 120 is secured to members of frame 112 at opposite sides of the vehicle by means of mounting brackets 122 and interposed elastomer bushings 124. Torsion bar 120 has integral legs 126, the bar and legs having an overall U shape as shown in FIG. 5. The free end of each leg 126 is provided with an eye 128 which is connected to a shackle 130 by a bolt 132 passing through the eye and through openings 134, 136 in the shackle. Elastomer bushings 138 are provided between eye 128 and bolt 132.

Shackle 130 is connected with axle 18 by an anchor plate 140 secured between spring 28 and the axle. Plate 140 has an extension 142 formed with an eye 144. A bolt 146 passes through openings 148, 150 in the shackle and through eye 144 to secure the two together. Elastomer bushings 152 are provided between the bolt and eye.

Spring 28, anchor 98, and shackle plate 140 are all clamped against axle 18 by U-bolts 30. As is conventional, spring leaves 40-48 are secured against relative lateral shifting by a bolt 154 which extends through aligned openings therein (FIG. 2). This bolt also extends through an opening 155 in anchor 98 and the head 156 of the bolt extends into an opening 158 in shackle plate 140 which is made relatively thick to receive the bolt head. The spring, anchor 98, and shackle plate 140 are thereby secured against horizontal shifting relative to each other.

In use, about 85 per cent of the vertical load of frame 12 is transmitted to axle 18 through air springs 110, hangers 78, and the portions of leaf springs 28 between the hangers and axle. Most of the remaining vertical load is transmitted to the axle through the portions of leaf spring 28 to the left of the axle as the drawings are viewed. Very little of the vertical load is carried by or transmitted to the axle through portions of leaf spring 28 between hanger 78 and shackle connection 68 to frame 12.

This portion of the spring is longitudinally beyond the load center of beam 76 and hangers 78. Consequently, in the interest of weight saving and economy, spring leaves 42-48 can terminate immediately adjacent this load center i.e. adjacent hanger 78 as shown in FIG. 1. Leaf 42 is shown as having a short truncated tapered portion extending beyond hanger 78 to avoid an abrupt corner about which top leaf 40 might otherwise flex too sharply.

A principal function of spring 28 is to absorb braking and driving torque on axle 18 and to absorb lateral thrust of the axle when vehicle 10 turns, rounds a curve, or the like. In this sense, spring 28 serves the function of the vertically swinging control arms in a conventional air suspension. Relative to such control arms, spring 28 is very inexpensive, much lighter weight, and is much easier to connect both to a conventional axle 18 and a vehicle frame 12.

Air springs 110 are provided with the usual leveling valves (not shown) by which the air pressure in the springs is automatically adjusted under varying load conditions to maintain frame 12 at a predetermined distance above axle 18.

When wheels 14 at opposite sides of the vehicle traverse unlike surfaces, the opposite ends of axle 18 move up and down relative to each other. Conversely, when the vehicle tilts or sways in rounding curves or traversing bumps, opposite sides of frame 12 move vertically relative to each other and relative to the ends of axle 18. These effects frequently occur simultaneously. Torsion bar 120 follows such movement of the frame while shackles 130 follow movements of the axle and carry the shackled ends of torsion bar legs 126 with them. Any unlike vertical movement of the opposite ends of axle 18 relative to frame 12 torsionally stresses bar 120 and the bar thus resists any such unlike movement. This resistance, in cooperation with leaf springs 28, stabilizes the vehicle.

Legs 126 and their shackles 130 in effect comprise a pair of levers which transmit such unlike movements to torsion bar 120. Viewed in this light, each lever has a joint between its ends at the connection between leg 126 and shackle 130. In the illustrated structure, this joint is a pivotal one whose axis is generally parallel to the axis of axle 18; and the axis of the pivotal connection of shackle 130 to plate 140 is also parallel to the axis of the axle.

Relative movement between the ends of axle 18 and frame 12 is generally linear. On the other hand, legs 126 are constrained to arcuate movement about the axis of the pivotal connections formed by mounting brackets 122 for torsion bar 120. This results in differential movement between the shackled ends of legs 126 and axle 18 upon relative movement of the axle and frame. Shackles 130 pivot with respect to plate 140 and the ends of legs 126 to permit this differential movement.

For example, should axle 18 move upwardly or frame 12 move downwardly from the position of FIG. 1, leg 126 would be swung to a position more nearly horizontal than the slope illustrated and its shackled end would therefore move closer to the axle. Shackle 130 swings clockwise to accommodate this variation in distance between leg 126 and axle 18. Conversely, should the height between axle 18 and frame 12 increase from the position of FIG. 1, shackle 130 would swing counterclockwise to permit the differential movement of the axle and leg 126.

Elastomer cushion 102 absorbs shock which would otherwise be transmitted from axle 18 through spring 28 and hanger 78 to beam 76. In addition, this cushion facilitates a limited amount of articulation between hanger 78 and spring 28. This feature makes the suspension more flexible and softens the ride provided by the suspension. Elastomer bushings 124 are also shock absorptive but their principal function is to prevent galling of the metal torsion bar 120 and its mounting brackets 122.

The suspension is suitable for use in connection with dead axles as well as the driven axle illustrated. Beam 76 and hangers 78 can be disposed either forwardly of the axle or rearwardly of the axle as shown. A plurality of the suspension structures illustrated can be used to mount a number of axles in tandem relation on a vehicle frame.

In general, the suspension is admirably adapted for use in any relatively light duty truck or equivalent vehicle. An example worthy of note is in motor home vehicles in which a human dwelling type body is mounted on a vehicle frame. The vehicle must be capable of carrying the load of the dwelling yet the suspension must provide a relatively soft but stable ride to avoid damage to the body and its contents.

A typical suspension 16 for use on motor home vehicles is one in which axle 18 has a load capacity of about 7,000 pounds. While the exact limits of the load range feasile with a suspension 16 is not known, the suspension can be tailored to meet load capacity requirements in the range from about 4,000 pounds to about 10,000 pounds per axle. This tailoring is accomplished by varying the size, for example, of air springs 110, leaf springs 28, and torsion bar 120.

We claim:

1. Land vehicle suspension structure which comprises, an axle with wheels mounted thereon, a pair of leaf springs secured to said axle adjacent said wheels, each spring having end portions adapted to be secured to a vehicle frame forwardly and rearwardly of said axle, means forming a beam which extends generally parallel to said axle, anchor means anchoring said beam in load transmitting relation to each of said leaf springs at a location longitudinally intermediate said axle and one of said end portions, air spring means mounted on said beam and being adapted to transmit vertical load between said beam and a vehicle frame, lever means adapted to be secured to a vehicle frame and being connected to follow vertical movement of portions of said axle relative to such vehicle frame, said axle portions being axially oppositely displaced from the axial center of said axle, and torsion means operable to resist at least certain swinging movements of said lever means incidental to vertical movement of said axle portions.

2. The structure defined in claim 1 wherein said anchor means comprises a hanger adjacent each end of said beam engaged with a said leaf spring through which load is transmitted between said beam and leaf spring.

3. The structure defined in claim 2 wherein each hanger extends over the top of a said leaf spring.

4. The structure defined in claim 3 wherein each hanger has side portions which embrace opposite sides of a said leaf spring and an interconnecting portion which so extends over said top of said leaf spring.

5. The structure defined in claim 1 wherein said anchor means comprises a hanger adjacent each end of said beam having sides which embrace opposite sides of a said leaf spring and a top which interconnects said sides and extends in spaced relation over a top portion of a said leaf spring, said top portion being angled to the horizontal in a direction longitudinal to said leaf spring and said hanger top extending generally horizontally so that the two define a tapered space, a cushion of elastomeric material tapered complementally to and disposed within said space, means including said hanger sides retaining said cushion in said space, a pin extending between said hanger sides beneath said leaf spring, a member having a bight through which said pin extends and which engages the bottom of said leaf spring so that said pin and bight contain said leaf spring within said hanger, said member having a portion which extends away from said bight and which has a fixed position relative to said axle, said member serving as a tie and a strut which secures said hanger at a predetermined location longitudinal of said leaf spring.

6. In combination, a vehicle and a suspension structure as defined in claim 1 mounted thereon.

7. The structure defined in claim 1 wherein each of said leaf springs comprises a plurality of spring leaves in stacked relation, said leaves having first portions which extend between said axle and the other of said end portions, contiguous ones of said first portions terminating at progressively varying distance from said axle, said leaves having second portions which extend between said axle and said one end portion, a plurality of said second portions terminating between said location and said one portion and at substantially the same distance from said axle.

8. The structure defined in claim 7 wherein said second portion of that leaf only which defines said one end portion extends substantially beyond said location.

9. The structure defined in claim 2 wherein said anchor means also comprises for each hanger a member secured thereto and having a fixed position relative to said axle, said member serving as a tie and strut which maintains said hanger at a predetermined longitudinal position relative to said leaf spring.

10. The structure defined in claim 2 wherein each leaf spring has a top portion angled to the horizontal in a direction longitudinal of said leaf spring, each hanger having an upper portion extending over and spaced from said top portion, said top and upper portions defining a tapered space therebetween, a complementally tapered cushion of elastomeric material being fitted within said space, and retaining means effective to retain said cushion within said space.

11. The structure defined in claim 10 wherein said upper portion has an end which faces the nearest said end portion of said leaf spring, said retaining means including an element secured to said cushion and engaged with said end.

12. The structure defined in claim 11 wherein said element comprises a metal clip fastened to said elastomeric material, said clip having a portion which projects from the narrower end of said tapered cushion and engages said end.

13. The structure defined in claim 12 wherein said clip portion is generally U-shaped.

14. The structure defined in claim 11 wherein said retaining means also includes portions of said hanger which adjoin said upper portion and embrace opposite sides of said cushion and leaf spring.

15. In combination, a vehicle and a suspension structure as defined in claim 9 mounted thereon.

16. In combination, a vehicle and a suspension structure as defined in claim 7 mounted thereon.

17. Land vehicle suspension structure which comprises, an axle with wheels monted thereon, a pair of leaf springs secured to said axle adjacent said wheels, each spring having end portions adapted to be secured to a vehicle frame forwardly and rearwardly of said axle, means forming a beam which extends generally parallel to said axle, anchor means anchoring said beam to each of said leaf springs at a location longitudinally intermediate said axle and one of said end portions, said anchor means comprising a hanger adjacent each end of said beam engaged with a said leaf spring through which load is transmitted between said beam and leaf spring, each hanger having side portions which embrace opposite sides of a said leaf spring and an interconnecting portion which extends over the top of a said leaf spring, each hanger including containing means associated with said side portions which engage the bottom of a said leaf spring and contain said leaf spring within said hanger, air spring means mounted on said beam and being adapted to transmit vertical load between said beam and a vehicle frame, lever means adapted to be secured to a vehicle frame and being connected to follow vertical movement of portions of said axle relative to such vehicle frame, said axle portions being axially oppositely displaced from the axial center of said axle, and torsion means operable to resist at least certain swinging movements of said lever means incidental to vertical movement of said axle portions.

18. The structure defined in claim 17 wherein said containing means comprises a pin which extends between said side portions.

19. The structure defined in claim 17 wherein said side portions have aligned openings and said pin comprises a bolt which extends therethrough.

20. Land vehicle suspension structure which comprises, an axle with wheels mounted thereon, a pair of leaf springs secured to said axle adjacent said wheels, each spring having end portions adapted to be secured to a vehicle frame forwardly and rearwardly of said axle, means forming a beam which extends generally parallel to said axle, anchor means anchoring said beam to each of said leaf springs at a location longitudinally intermediate said axle and one of said end portions, said anchor means comprising a hanger adjacent each end of said beam engaged with a said leaf spring through which load is transmitted between said beam and leaf spring, said anchor means also comprising for each hanger a member secured thereto and having a fixed position relative to said axle, said member serving as a tie and strut which maintains said hanger at a predetermined longitudinal position relative to said leaf spring, each hanger having side portions which engage opposite sides of a said leaf spring and an interconnecting portion which extends over the top of said leaf spring, a pin extending between said side portions beneath said leaf spring, said member having a bight portion adjacent one end through which said pin extends to so secure said hanger and member together, air spring means mounted on said beam and being adapted to transmit vertical load between said beam and a vertical frame, lever means adapted to be secured to a vehicle frame and being connected to follow vertical movement of portions of said axle relative to such vehicle frame, said axle portions being axially oppositely displaced from the axial center of said axle, and torsion means operable to resist at least certain swinging movement of said lever means incidental to vertical movement of said axle portions.

21. The structure defined in claim 20 wherein said bight is engaged against the bottom of said leaf spring.

22. The structure as defined in claim 21 wherein said bight extends substantially throughout the distance between said side portions.

23. The structure defined in claim 20 wherein the other end of said member is affixed between said axle and the bottom of said spring.

24. The structure defined in claim 23 wherein said member has the form of a generally flat strap formed adjacent said one end to provide said bight.

25. Land vehicle suspension structure which comprises, an axle with wheels mounted thereon, a pair of leaf springs secured to said axle adjacent said wheels, each spring having end portions adapted to be secured to a vehicle frame forwardly and rearwardly of said axle, means forming a beam which extends generally parallel to said axle, anchor means anchoring said beam to each of said leaf springs at a location longitudinally intermediate said axle and one of said end portions, air spring means mounted on said beam and being adapted to transmit vertical load between said beam and a vehicle frame, lever means adapted to be secured to a vehicle frame and being connected to follow vertical movement of portions of said axle relative to such vehicle frame, said axle portions being axially oppositely displaced from the axial center of said axle, and torsion means operable to resist at least certain swinging movements of said lever means incidental to vertical movement of said axle portions, said lever means lying on a slope between the vehicle frame and axle when said structure is mounted on a vehicle, said lever means being jointed to facilitate variation of its length upon variation of said slope incidental to vertical movement of said axle portions relative to the vehicle frame, said lever means comprising a so jointed lever for each of said axle portions, the joint of each lever comprising a pivotal joint between its end and a pivotal connection of one of its ends to connecting means carried by said axle, the axis of said pivotal joint and connection being generally parallel to the axis of said axle.

26. The structure defined in claim 25 wherein said connecting means comprises an element anchored between said leaf spring and axle, said element having an extension which forms a member of said pivotal connection.

27. The structure defined in claim 26 wherein said element has the form of a flat plate and said member has the form of an eye.

28. The structure defined in clalim 25 wherein said pivotal joint is relatively close to said one end of said lever and is relatively remote to the other end of said lever.

29. The structure defined in claim 25 wherein said anchor means comprises a hanger adjacent each end of said beam engaged with a said leaf spring through which load is transmitted between said beam and leaf spring, and means forming both a strut and a tie between said hanger and axle effective to maintain said hanger at a predetermined longitudinal position relative to said leaf spring.

30. The structure defined in claim 29 wherein each of said leaf springs comprises a plurality of leaves in stacked relation, said leaves having first portions which extend between said axle and the other of said end portions, contiguous ones of said first portions terminating at progressively varying distances from said axle, said leaves having second portions which extend between said axle and said one end portion, a plurality of said second portions terminating between said location and said one end and at substantially the same distance from said axle.

31. In combination, a vehicle and a suspension structure as defined in claim 29 mounted thereon.

* * * * *

PO-1050
(5/69)

UNITED STATES PATENT OFFICE
CERTIFICATE OF CORRECTION

Patent No. 3,850,445            Dated November 26, 1974

Inventor(s) David R. Borns and William C. Pierce

It is certified that error appears in the above-identified patent and that said Letters Patent are hereby corrected as shown below:

In claim 7, column 5, the last line in the column, "distance" should be --distances--.

In claim 7, column 6, line 4, after "one" but before "portion" insert --end--.

Signed and sealed this 21st day of January 1975.

(SEAL)
Attest:

McCOY M. GIBSON JR.
Attesting Officer

C. MARSHALL DANN
Commissioner of Pat